Sept. 17, 1957

T. J. SULPIZIO ET AL 2,806,988

HIGH VOLTAGE POWER SUPPLIES

Filed March 13, 1952

INVENTORS
Thomas J. Sulpizio
& John E. M<sup>c</sup>Wade
BY
ATTORNEY

United States Patent Office 2,806,988
Patented Sept. 17, 1957

2,806,988

HIGH VOLTAGE POWER SUPPLIES

Thomas John Sulpizio, Philadelphia, and John E. McWade, Havertown, Pa., assignors, by mesne assignments, to the United States of America as represented by the Secretary of the Navy Application March 13, 1952, Serial No. 276,412

11 Claims. (Cl. 321—2)

This invention relates to high voltage power supplies and, in particular, to an improved pulse power supply.

It is difficult to design an efficient, well-regulated, high voltage power supply without using a large step-up transformer and a great number of vacuum tubes. One solution has been found in the R. F. oscillator type of power supply where a large R. F. voltage is built up across the tank circuit of an R. F. oscillator and then is rectified to provide the desired high voltage D.-C. The R. F. transformer utilized in this system is much smaller than the usual A.-C. transformer and is more efficient. While the R. F. oscillator type of power supply is a great improvement over the older A.-C. transformer step-up system, it has a few undesirable features.

1. A large number of tubes, which require a considerable current, must be utilized where good voltage regulation, as well as a high voltage output, is desired.

2. A rather high plate voltage must be supplied to the tubes in the R. F. oscillator.

3. While the A. F. oscillator system makes possible a considerable reduction in space, it still occupies a large amount of volume.

It has been found that the pulse-type power supply makes it possible to get very high voltages with a relatively small transformer and fewer tubes than are used in the R. F. power supply. The pulse is the equivalent of a very high frequency and thus it gives a very large initial step-up in the output transformer primary, making it unnecessary to have a large turns ratio in the transformer. Presently known pulse power supplies, however, are difficult to regulate and are not as efficient as might be desired.

It is an object of the present invention to provide a pulse power supply which occupies a small amount of space.

It is still a further object of the present invention to provide a pulse power supply that is efficient and well regulated.

It is still a further object of the present invention to provide a novel and useful pulse power supply.

These and further objects of the present invention are achieved by utilizing a resonant charging network and a resonant discharging network. The resonant charging network includes a charging inductor and a capacitor. The resonant discharging network includes the capacitor, a discharging inductor, and a gas tube. One end of the discharging inductor is connected to the junction of the charging inductor and the capacitor. The other end of the discharging inductor is connected to the anode of the gas tube. The cathode of the gas tube is connected to the capacitor. A low D.-C. voltage is applied to the resonant charging network. As a result, a sinusoidal voltage develops across the capacitor. A resonant discharge path is closed for the capacitor at a predetermined time during the charging cycle by firing the gas tube. The gas tube remains fired until the current through the discharge inductor passes through a zero current condition. This occurs when the voltage across the capacitor is at a maximum and has a polarity which aids the low D.-C. voltage. The residual capacitor voltage serves to increase the peak voltage developed during the next resonant charging cycle. If the gas tube is fired at the same time during each resonant charging cycle, the pulse voltage across the discharge inductor increases until it is many times the amplitude of the low D.-C. voltage. The pulse voltage appearing across the discharging inductor is then stepped up through a small transformer, rectified and filtered to provide the desired high voltage D.-C.

Where regulation is desired, a sample of the high voltage D.-C. is taken and compared with a reference voltage. The difference between the sample voltage and the reference voltage is used as a control which determines the time during the resonant charging cycle that the capacitor is discharged. As the high voltage D.-C. tends to fall below the level desired, the control adjusts the capacitor discharge time such that a greater capacitor voltage is discharged through the discharge inductor during each discharging cycle.

The novel features of the invention as well as the invention itself, both as to its organization and method of operation, will best be understood from the following description, when read in connection with the accompanying drawing in which.

Figure 1:
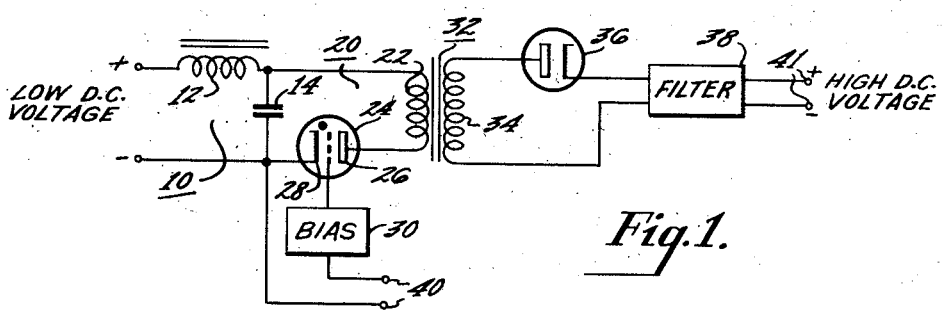
Figure 1 shows a circuit diagram of an embodiment of the invention.

Referring particularly to Figure 1 of the drawing, there is shown a circuit diagram of the basic embodiment of the invention. A low D.-C. voltage is applied to a resonant charging network 10 which includes a charging inductor 12 and a capacitor 14. The capacitor is also included in a resonant discharging network 20 which includes a discharging inductor 22 and a gas discharge tube 24. The discharging inductor has a much smaller inductance than the charging inductor. The anode 26 of the gas tube is connected to the discharge inductor and the cathode 28 of the gas tube is connected to the capacitor. A bias 30 is provided to make the gas tube normally non-conductive. The discharge inductor serves also as the primary of a transformer 32 which has it secondary winding 34 connected to a rectifier 36. The rectifier 36 is connected to a filter 38 which provides as its output the desired high voltage D.-C. Input terminals 40 are provided for applying firing pulses to the grid of the gas tube. A high D.-C. voltage is derived from output terminals 41 connected to the filter.

Figure 4:
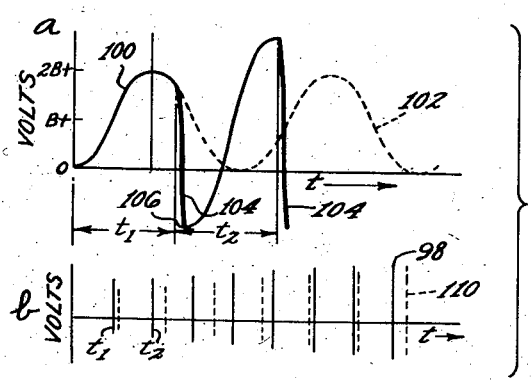
Figure 4 shows the wave forms which appear during the operation of the circuits shown in Figures 1, 2, and 3.

When the low D.-C. voltage is first applied to the resonant charging network 10, the capacitor 14 begins to charge as shown by the curve 100 in Figure 4a. If the gas tube is held non-conductive, the voltage wave form across the capacitor 14 appears as a sinusoid having an A.-C. component equal in amplitude to B+ and a D.-C. component equal in amplitude to B+. Thus, the peak sinusoidal voltage is equal to 2B+. This is shown in Figure 4a as a solid line wave form 100 up to the point of where the gas tube is fired, and as a dotted line wave form 102 thereafter.

Assume that the gas tube is fired after a time $t_1$ measured from the start of the resonant charging cycle, and that it is fired at equal intervals thereafter. This is shown in Figure 4a, where the voltage across the capacitor during the period of gas tube conduction is shown as a very heavy line wave form 104. At time $t_1$, the capacitor has a positive voltage across it which is greater than B+. When the gas tube 24 is fired, a resonant discharge path is closed for the capacitor 14 and current begins to flow through the discharge inductor 22 and the voltage across the capacitor begins to fall along a high frequency sinusoidal curve as is shown by the heavy wave form line in Figure 4a. The current through the discharge inductor is substantially 90° out of phase with the voltage across the capacitor and consequently becomes maximum when the capacitor voltage is zero and becomes zero when the capacitor voltage is maximum at its negative peak 106. Since the gas tube remains fired until the current through it is reduced to zero, the resonant discharge path is not opened until the voltage across the capacitor reaches its negative peak 106. This negative peak, as shown in Figure 4a, is not equal in amplitude to the full positive peak at the beginning of the resonant discharging cycle because of the damping losses in the discharge network.

After the gas tube 24 cuts off, the capacitor begins to charge in the positive direction again through the resonant charging network. In this second resonant charging cycle, the initial voltage across the capacitor is added to the low voltage D.-C. and causes the resonant charging voltage to reach a peak which is increased over 2B+ by an amount equal to the residual negative capacitor voltage. Successive resonant cycles, charging and discharging, result in larger and larger sinusoidal charging amplitudes. The voltage across the capacitor reaches a stable condition, however, after several cycles when any increase in voltage across the capacitor would be compensated for by a decrease caused by a phase delay which is due to the residual current in the charging inductor which remains after the gas tube is fired. As the resonant charging peaks increase in amplitude, the resonant discharging peaks increase proportionally as shown in Figure 4b, where the resonant discharge cycles are shown as straight vertical lines. The straight line wave form 98 is an approximation of the high frequency resonant discharging cycle. The dotted line wave form 110 shown in Figure 4b represents the pulse wave form which appears across the capacitor and discharging inductor when the gas tube is fired at a lower frequency than the frequency of firing represented by the solid line wave form 98. The lower firing frequency discharges the capacitor later in each resonant charging cycle and when it has less voltage across it. As a result, the pulse output reaches a level which is of smaller amplitude than it reaches when the capacitor is discharged earlier in each resonant charging cycle. It should be noted that if the high frequency firing discharges the capacitor before it reaches its peak voltage a decrease in frequency results in a greater pulse amplitude rather than a smaller pulse amplitude across the discharge inductor.

The pulse voltage shown in Figure 4b appears across the discharge inductor, which is also the primary of a step-up transformer 32, is rectified and filtered to provide desired high voltage D.-C.

Figure 2:
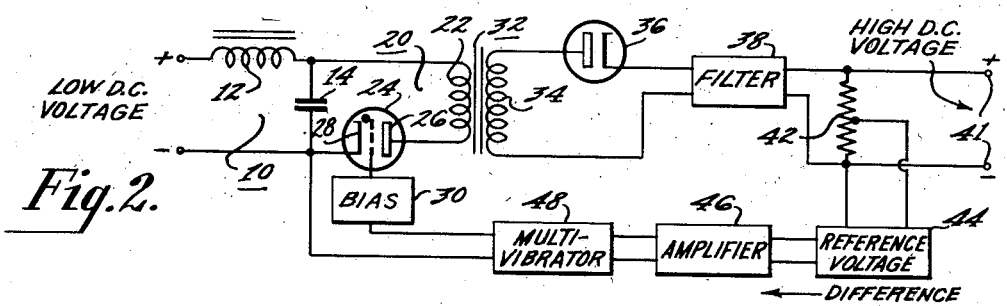
Figure 2 is a circuit diagram of one modification of the invention.
Figure 3:
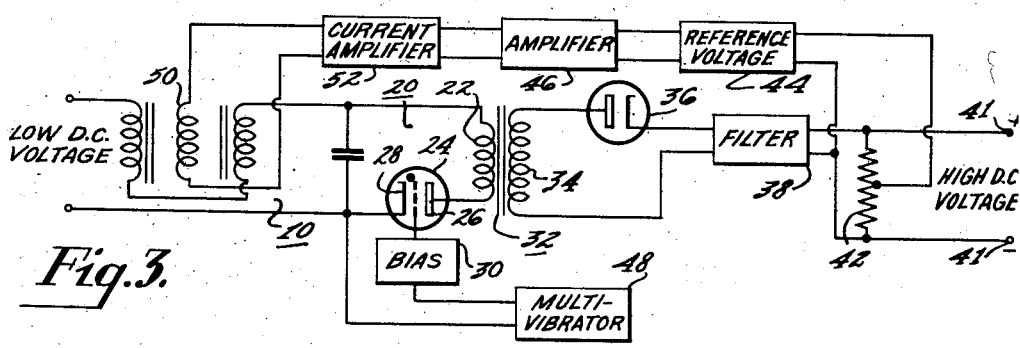
Figure 3 is a circuit diagram of another modification of the invention.

The relationship between the firing frequency and the output voltage amplitude may be utilized to provide voltage regulation. Two embodiments of the invention wherein this principle is utilized are shown in Figures 2 and 3. In Figure 2, the same basic circuit is used as is shown in Figure 1. Similar components are given the same reference numeral. A sample high D.-C. voltage is taken from the high D.-C. voltage output. This sample voltage may be obtained by any convenient means such as by using a bleeder potentiometer 42 which is connected across the D.-C. output. The sample is compared to a reference voltage 44 and the difference between the sample voltage and the reference voltage is passed through an amplifier 46. The output of the amplifier is used to control the bias level of a free-running multivibrator 48. Such a multivibrator may be of the type shown and described on page 28 of a book by O. S. Puckle entitled "Time Bases," published by John Wiley and Sons. The feature of this multivibrator is that a change in grid bias voltage causes a proportional change in the multivibrator frequency. The multivibrator output is coupled to the grid of the gas tube. The difference voltage causes a change in multivibrator frequency which, in turn, changes the pulse output amplitude developed across the discharge inductor. With proper adjustment, the frequency and pulse output amplitude changes can be made to compensate for the different voltage with the result that the difference voltage tends to go to zero. When the difference voltage is zero the circuit provides the desired high D.-C. voltage output.

In the system shown in Figure 3, the multivibrator frequency is fixed while the resonant charging cycle frequency is varied. The circuit shown in Figure 3 uses the same basic circuit shown in Figure 1 and similar components bear the same reference number. The same sampling, comparing and amplifying technique is utilized as is utilized for the circuit as shown in Figure 2. Thus, the sampling potentiometer 42, the reference voltage 44, and the amplifier 46 may be the same as shown in Figure 2. The resonant charging frequency is varied by varying the inductance of the charging inductor. This is achieved by utilizing a saturable reactor 50 in the charging inductor winding and by varying the current which is passed through the saturable reactor winding. The core and winding of the saturable reactor are selected so that a variation in current through the winding causes a proportional variation in flux saturation in the core. Since the inductance of the charging inductor depends upon the flux condition of its core, any variation in flux saturation caused by a current creates a proportional change in the charging inductor inductance. The saturable reactor and the charging inductor are wound on the same core. D.-C. current through the saturable reactor is used to control the A.-C. current through the charging inductor. The amplified difference voltage is applied to a current amplifier 52 which provides a current which is proportional to the difference voltage. When the high D.-C. voltage in the output decreases the current through the saturable reactor winding changes, the inductance of the charging inductor changes and the resonant charging cycle frequency changes. These changes are made such that the capacitor is discharged at a time during each resonant charging cycle when it has a higher voltage than it had before the high D.-C. voltage output dropped. A similar action occurs when the high D.-C. voltage increases above the level desired. As explained above the circuit assumes a stable condition where the difference voltage is made zero.

From the foregoing description, it will be readily apparent that the invention provides an improved pulse power supply which occupies a small amount of space, is efficient and can be well regulated.

We claim:

1. A pulse power supply comprising means providing resonant charging cycles, means providing resonant discharging cycles, said resonant discharging cycles having a substantially greater frequency than said resonant charging cycles, means for rendering said resonant discharging cycle means operative at a predetermined time during each of said resonant charging cycles, means for rendering said discharging cycle means inoperative at a predetermined time after the start of said resonant discharging cycle, means for applying a low D.-C. voltage to said resonant charging cycle providing means, and means for deriving a high D.-C. voltage from said resonant discharging cycle means.

2. A pulse power supply comprising means providing low frequency sinusoidal charging including a capacitor, circuit means coupled to said capacitor providing high frequency sinusoidal discharging, means for closing said discharging circuit at a predetermined time during each charging cycle, means for opening said discharging circuit at a predetermined time after the start of a discharge cycle, means for applying a low D.-C. voltage to said low frequency sinusoidal charging circuit, and means for deriving a high D.-C. voltage from said high frequency sinusoidal discharging circuit.

3. A pulse power supply comprising means providing resonant charging cycles including a charging inductor and a capacitor having one end connected to one end of said charging inductor, means for applying a first D.-C. voltage between the other end of said charging inductor and the other end of said capacitor, a discharging inductor having substantially lower inductance than said charging inductor, said discharging inductor having one end connected to the junction of said capacitor and said charging inductor, means for closing a resonant discharge path between the other end of said discharge inductor and said capacitor at a predetermined time during each of said resonant charging cycles, means for opening said resonant discharge path in response to a zero current condition through said discharge inductor, whereby the voltage developed across said capacitor during said resonant discharge cycle has a polarity opposite to that of the voltage present on said capacitor at the end of said resonant charging cycle and the pulse voltage developed across said discharge inductor becomes many times as large as the amplitude of said first D.-C. voltage, and means coupled to said discharge inductor to convert said amplified pulse voltage to high voltage D.-C.

4. A pulse power supply as recited in claim 3 wherein the means to close a resonant discharge path between the other end of said discharge inductor and said capacitor at a predetermined time during each of said resonant charging cycles and the means to open said resonant discharge path in response to a zero current condition through said discharge inductor includes a gaseous discharge tube having at least a cathode, an anode, and a control grid, said anode being connected to the other end of said discharge inductor and said cathode being connected to the other end of said capacitor and means for applying firing pulses to the grid of said tube at said predetermined time during each resonant charging cycle.

5. A pulse power supply as recited in claim 3 wherein the means coupled to said discharge inductor to convert said amplified pulse voltage to high voltage D.-C. is a transformer secondary winding inductively coupled to said discharge inductor, a rectifier circuit connected to said transformer secondary, and a filter circuit connected to the output of said rectifier.

6. A pulse power supply comprising a charging inductor and a capacitor having one end connected to one of said charging inductor; means for applying a first D.-C. voltage between the other ends of said other charging inductor and said capacitor, a discharging inductor having substantially lower inductance than said charging inductor, said discharging inductor having one end connected to the junction of said capacitor and said charging inductor; means for closing a resonant discharge path between the other end of said discharge inductor and said capacitor at a predetermined time during each of said resonant charging cycles and for opening said resonant discharge path in response to a zero current condition through said discharge inductor, said means including a gaseous discharge tube having at least a cathode, an anode, and a control grid, said anode being connected to the other end of said discharge inductor and said cathode being connected to the other end of said capacitor and means for applying firing pulses to the grid of said tube at said predetermined time during each resonant charging cycle, said pulse applying means including a multivibrator having a variable frequency; and means coupled to said discharge inductor to convert said amplified pulse voltage to high voltage D.-C. including a transformer wherein said discharge inductor is the primary winding, a rectifier circuit connected to the secondary of said transformer, and a filter circuit connected to the output of said rectifier.

7. A high voltage, regulated, pulse power supply comprising a charging inductor, a capacitor having one end connected to one end of said charging inductor; means for applying a first D.-C. voltage between the other ends of said charging inductor and said capacitor; a discharging inductor having substantially lower inductance than said charging inductor, said discharging inductor having one end connected to the junction of said capacitor and said charging inductor; means for closing a resonant discharge path between the other end of said discharge inductor and said capacitor at a predetermined time during each of said resonant charging cycles and for opening said resonant discharge path in response to a zero current condition through said discharge inductor, said means including a gaseous discharge tube having at least a cathode, an anode and a control grid, said anode being connected to the other end of said discharge inductor and said cathode being connected to the other end of said capacitor and means for applying firing pulses to the grid of said gas tube at said predetermined time during each resonant charging cycle; means coupled to said discharge inductor to convert said amplifier pulse voltage to high voltage D.-C. including a transformer wherein said discharge inductor is the primary winding, a rectifier circuit connected to the secondary of said transformer, and a filter circuit connected to the output of said rectifier; and means responsive to said high voltage D.-C. for determining the time during each of said resonant charging cycles when said gaseous discharge tube is fired such that a decrease of high voltage D.-C. in the output is compensated for by an increase in the voltage across said discharge inductor.

8. A high voltage, regulated, pulse power supply as recited in claim 7 wherein said means responsive to said high voltage D.-C. for determining the time during each of said resonant charging cycles when said gaseous discharge tube is fired includes a multivibrator for applying firing pulses to said gaseous discharge tube, a potentiometer connected to said high D.-C. voltage output for deriving therefrom a sample voltage, means for comparing said sample voltage with a reference voltage, and means to vary said multivibrator pulsing frequency responsive to the difference between said sample voltage and said reference voltage, whereby the period between said firing pulses is regulated such that a decrease of high voltage D.-C. is compensated for by an increase in the voltage across said discharging inductor.

9. A high voltage, regulated, pulse power supply as recited in claim 7 wherein said means responsive to said high voltage D.-C. for determining the time during each of said resonant charging cycles when said gaseous discharge tube is fired includes a saturable reactor coupled to said charging inductor having a D.-C. winding, the D.-C. current through said saturable reactor D.-C. winding determining the inductance of said charging inductor, a multivibrator having a fixed frequency connected to said gaseous discharge tube for providing firing pulses, a potentiometer connected to said high voltage D.-C. output for deriving sample voltage therefrom, means for deriving a reference voltage, means for comparing said sample voltage with said reference voltage, and means for applying current to said saturable reactor responsive to the difference between said sample voltage and said reference voltage whereby change of high voltage D.-C. at said output is compensated for by a change in the voltage across said discharge inductor.

10. A high voltage, regulated, pulse power supply comprising a charging inductor and a capacitor having one end connected to one end of said charging inductor, means for applying a first D.-C. voltage between the other end of said charging inductor and the other end of said capacitor, a discharging inductor having substantially lower inductance than said charging inductor, said discharging inductor having one end connected to the junction of said capacitor and said charging inductor, a gaseous discharge tube having at least a cathode, an anode, and a control grid, said anode being connected to the other end of said discharge inductor and said cathode being connected to the other end of said capacitor, means including a free-running multivibrator for applying firing pulses to the grid of a gas tube at a predetermined time during each resonant charging cycle, a step-up secondary winding inductively coupled to said discharge inductor, a rectifier circuit connected to said secondary winding, a filter circuit connected to the output of said rectifier, means to derive a sample voltage from said high D.-C. voltage output, means to establish a reference voltage, means for comparing said sample voltage with said reference voltage, and means to vary said multivibrator frequency responsive to the difference between said sample voltage and said reference voltage, whereby the period between said firing pulses is regulated such that a decrease of high voltage D.-C. is compensated for by an increase in the voltage across said discharging inductor.

11. A high voltage, regulated, pulse power supply comprising a charging inductor and a capacitor having one end connected to one end of said charging inductor, means for applying a first D.-C. voltage between the other ends of said charging inductor and said capacitor, a discharging inductor having substantially lower inductance than said charging inductor, said discharging inductor having one end connected to the junction of said capacitor and said charging inductor, a gaseous discharge tube having at least a cathode, an anode and a control grid, said anode being connected to the other end of said discharge inductor and said cathode being connected to other end of said capacitor, means including a free-running multivibrator for applying firing pulses to said grid of said gas tube, a secondary winding inductively coupled to said discharging inductor, a rectifier circuit connected to said secondary winding, and a filter circuit connected to the output of said rectifier, a saturable reactor coupled to said charging inductor such that a change of current through said saturable reactor changes the inductance of said charging inductor, a potentiometer connected to said high voltage D.-C. output for deriving sample voltage therefrom, means for applying a reference voltage, means for comparing said sample voltage with said reference voltage, and means responsive to the difference between said sample voltage and said reference voltage for applying current to said saturable reactor which is proportional to said difference voltage, whereby a change of high voltage D.-C. at said output is compensated for by a change in the voltage across said discharge inductor.

References Cited in the file of this patent

UNITED STATES PATENTS

| | | |
|---|---|---|
| 2,147,474 | Wagner et al. | Feb. 14, 1939 |
| 2,279,149 | Tawney | Apr. 7, 1942 |
| 2,302,876 | Malling | Nov. 24, 1942 |
| 2,436,794 | Dawson | Mar. 21, 1948 |
| 2,555,305 | Alty | June 5, 1951 |